United States Patent
Kirma

[11] Patent Number: 5,817,980
[45] Date of Patent: Oct. 6, 1998

[54] CONNECTOR ELEMENT FOR VARIABLY LAYING AND PROTECTING ELECTRICAL CABLES

[75] Inventor: Safa Kirma, Wedel/Holstein, Germany

[73] Assignee: Daimler-Benz Aerospace Airbus GmbH, Hamburg, Germany

[21] Appl. No.: 393,094

[22] Filed: Feb. 22, 1995

[30] Foreign Application Priority Data

Feb. 25, 1994 [DE] Germany .......................... 44 06 197.8

[51] Int. Cl.⁶ .................................................. H02G 3/06
[52] U.S. Cl. ........................... 174/86; 174/68.3; 174/89; 285/249; 285/243
[58] Field of Search ............................. 174/68.3, 65, 55, 174/89, 86; 285/243, 56, 249, 116, 222.1, 222.4, 247, 349; 439/472

[56] References Cited

U.S. PATENT DOCUMENTS

| | | | |
|---|---|---|---|
| 2,428,189 | 9/1947 | Wolfram | 285/249 |
| 3,120,966 | 2/1964 | Lyon | 174/89 X |
| 3,156,491 | 11/1964 | Jackson et al. | 174/89 X |
| 3,819,849 | 6/1974 | Baker | 174/86 |

FOREIGN PATENT DOCUMENTS

| | | |
|---|---|---|
| 1828169 | 3/1961 | Germany . |
| 3914930 | 10/1990 | Germany . |
| 4007886 | 9/1991 | Germany . |

*Primary Examiner*—Hyung S. Sough
*Attorney, Agent, or Firm*—W. F. Fasse; W. G. Fasse

[57] ABSTRACT

A connector element is provided for variably laying and protecting insulated electrical conductors or cables for interconnecting the electrotechnical devices and lightning protective systems in aircraft and spacecraft. The connector element (29) includes a protective corrugated hose (25) connected to a screw-on component (1) by a collar nut (3) screwed onto the screw-on component (1). The collar nut (3) engages a flange (26A) on an end of the hose (25) and clamps it against the screw-on component (1). Insulated electrical conductors or cables (8) are guided through the hose (25), which is conductively connected to the aircraft structure. The hose (25) serves to protect, hold, and guide the electrical cables (8) in a desired configuration. The corrugated hose (25) includes a compressed portion (25A) with a small corrugation spacing, whereby the hose (25) is bendable into a desired configuration, yet is form-retaining and flexurally stiff to maintain the bent configuration.

17 Claims, 4 Drawing Sheets

CONNECTOR ELEMENT FOR VARIABLY LAYING AND PROTECTING ELECTRICAL CABLES

FIELD OF THE INVENTION

The invention relates to a connector element for variably laying and protecting electrical conductors or cables with components of electrical systems, especially for electrical cables that interconnect the electrotechnical apparatus and lightning protective systems in aircraft and spacecraft. Such connector elements are suitable for laying protective hose connections that have a form-retaining elbow or bend part, and that protect insulated electrical conductors, especially auxiliary and control conductors, in an aircraft.

BACKGROUND INFORMATION

Terminal connectors and junction connectors of electrical conductors should be embodied in such a manner that they can withstand all possible technical demands, including mechanical, thermal, electrical, and chemical loads that arise in operation. For this reason, insulated electrical cables are laid out in protective hoses or conduits at certain locations in aircraft, to protect the cables from external mechanical influences or electromagnetic interferences, especially voltage overloading due to lightning strikes and the like. More particularly, protective hose terminal connectors are laid out in aircraft, where the connectors are to be connected to a large number of closely spaced, electrically operated devices or assemblies, which require greatly differing input signals and have greatly differing interference sensitivities.

However, the prior art cable guides cannot be laid out in a form-stable or shape-retaining manner in an aircraft. More specifically, it is known in the art to lay out protective hose connectors between electrical components arranged in very close proximity to one another, at least partially using corrugated hoses that protect the electrical conductor connections against external mechanical influences and electromagnetic interferences, but do not have any rigidity or form-stability for holding the conductors in a desired path and configuration.

German Patent 3,914,930 discloses a connector element using a metallic corrugated or ribbed hose as a shielding hose in an electrotechnical system. The corrugated hose is generally flexible and any bend or directional change, such as a right-angle turn for connecting to an electrical device, is achieved by holding the corrugated hose rigidly within a stiff right-angle elbow member comprising two right-angled half shells that are connected together around the corrugated hose. Bends can only be formed at the fixed, predefined angles provided by the available half shells for connecting to an electrical device. The known connector element does not provide a variably or selectively bendable, yet flexurally stiff and shape-retaining part for laying out and connecting insulated electrical cables to an electrical device. The known flexible corrugated hose simply provides effective protection against external mechanical influences and electromagnetic interferences.

German Patent 4,007,886, which is a companion patent to the above mentioned German Patent 3,914,930, discloses the use of nonconducting hoses to protect electrical conductors or cables from abrasion. The nonconducting hose is inserted or arranged in a sectional hose, such as the corrugated hose of German Patent 3,914,930 described above, in order to protect the electrical cables against possible abrasive effects resulting from the above described external mechanical loads.

German Utility Model Publication 1,828,169 discloses a connector element for connecting an electrical component to a metal hose formed from a spiral wound metal band. The connector element includes a one-piece flanged sleeve that has an internal or external threading corresponding to the spiral pitch of the spiral wound hose, so that the sleeve can be correspondingly screwed onto or into the hose. The flange is then fixed against a screw-in connector of the electrical component by a threaded collar that is screwed into the screw-in connector. Such a connector has a disadvantageous shielding characteristic for shielding against external electromagnetic interferences, because the electrical resistance at the transition between the flanged sleeve and the metallic hose cannot be precisely defined and maintained, and because the electrical conduction path cannot be reliably maintained through the transitions between the threaded collar, the flange, and the internal threaded screw-in connector.

Because the prior art spiral wound metal hose is flexible and does not maintain a directional change, i.e. a bend, in a form-stable or shape-retaining manner, the disclosed arrangement cannot be used in aircraft installations for interconnecting electrical and/or mechanical components in the tightest possible spaces. Furthermore, this manner of connecting the metallic hose is not suitable for use in aircraft because it is not sufficiently robust against mechanical loads, such as mechanical shocks, vibrations, or other transmitted loads to which the metal hose connection is subjected during flight. The disruption of the metal hose connection to the individual components included in an aircraft electrotechnical protective system will jeopardize the effectiveness of the lightning protection system.

OBJECTS OF THE INVENTION

In view of the above it is the aim of the invention to achieve the following objects singly or in combination:

to provide a connector element of the above described type, which can be bent as desired to achieve nearly any required directional change, and which then maintains the bent configuration in a form-stable manner for guiding electrical cables and connecting them to electrical and/or mechanical components of an aircraft;

to provide such a connector element having a bendable, but flexurally stiff and form-stable hose or conduit component that can be connected to other components of the electrotechnical system of the aircraft in a manner that satisfies all requirements relating to the laying of cables with variable changes of direction and relating to protecting the enclosed insulated electrical cables from external influences;

to provide such a connector element that ensures and reliably maintains a defined electrical resistance in the electrical conduction path from the conductive hose to a screw-on component and to an electrical device or to other electrically conducting structures of the aircraft;

to provide such a connector element having a corrugated hose section that can be bent as desired over a wide range of angles for different particular applications without kinking, crushing, or reducing its rated internal cross-sectional area or its wall thickness; and to provide such a connector element that is robust and resistant to negative influences of mechanical loads, such as mechanical shocks, vibrations, and other transmitted mechanical loads.

SUMMARY OF THE INVENTION

The above objects have been achieved in a connector element for variably laying and protecting electrical cables according to the invention, wherein the connector element includes a threaded screw-on component and a protective hose that is connected to the screw-on component by a female collar nut. Insulated electrical cables are laid through the hollow interior of the protective hose, which also acts as a directing and guide hose for the cables. The hose comprises a bendable yet form-retaining, flexurally stiff, corrugated or ribbed hose that includes at least one compressed hose portion having a relatively small pitch of the corrugations, i.e. a small spacing between adjacent corrugations.

One end of the corrugated hose includes a flange that is fixed to the screw-on component by the female collar nut. The other end of the corrugated hose can be formed as a flat walled, smooth sleeve. In addition to the compressed hose portion, the connector element may also comprise an expanded hose portion that has a relatively large corrugation spacing, with a seamless transition between the two hose portions. The corrugated hose is preferably electrically conductive and manually bendable to any desired angle within an angular range of 0° to 180°.

A major advantage of the connector element according to the invention is that its guide hose or directing hose can be laid out in almost any required configuration, with variable bend angles, within the tightest possible spaces, because the guide hose is embodied as a bendable, yet form-retaining, flexurally stiff corrugated hose. Moreover, this is achieved while still assuring the protection of the insulated electrical cables that are laid out in the hollow interior of the hose against external mechanical influences and electromagnetic interferences, because the corrugated hose maintains its cross-sectional area without crushing or kinking when it is bent into the required configuration.

Thus, it is possible to lay out the connector element among several electronic devices or assemblies within very tight spaces, along straight paths or around angled bends, without any reduction in its rated cross-sectional area. The at least one compressed portion or zone of the corrugated hose is the portion that can be bent to the required angle. By providing supplemental connector hoses that can be screwed into or onto the guide hose, the variety of possible layout configurations can be expanded and the possibilities for providing protection of installed cable bundles can easily be extended. The supplemental connector hose simply must have a smaller or larger diameter, but the same corrugation spacing as the adjacent portion of the guide hose.

The particular embodiment including an extended or expanded portion connected in a seamless manner to the compressed portion of the corrugated hose makes it possible to lengthen the corrugated hose in a direction along the central axis of the connector element. The connector element may be constructed to have any required length by connecting any desired number of successive corrugated hoses together in such a seamless manner.

The corrugated hose forming the directional guide hose can have ring corrugations or spiral corrugations, depending on which associated advantageous characteristics are desired for a particular application. The use of a spiral corrugated hose made of synthetic materials provides the necessary protection against abrasion for the insulated electrical cables arranged within the hose. The formation of a smooth sleeve on the end of the expanded portion of the guide hose provides a flat outer circumferential surface, so as to provide an electrical contact surface achieving the lowest possible electrical contact resistance.

BRIEF DESCRIPTION OF THE DRAWINGS

In order that the invention may be clearly understood, it will now be described, by way of example, with reference to the accompanying drawings, wherein:

FIG. 3A is a cut-away detail view showing another embodiment of the connection of the expanded portion of the corrugated hose with the other corrugated hose.

DETAILED DESCRIPTION OF PREFERRED EXAMPLE EMBODIMENTS AND OF THE BEST MODE OF THE INVENTION

Figure 1:
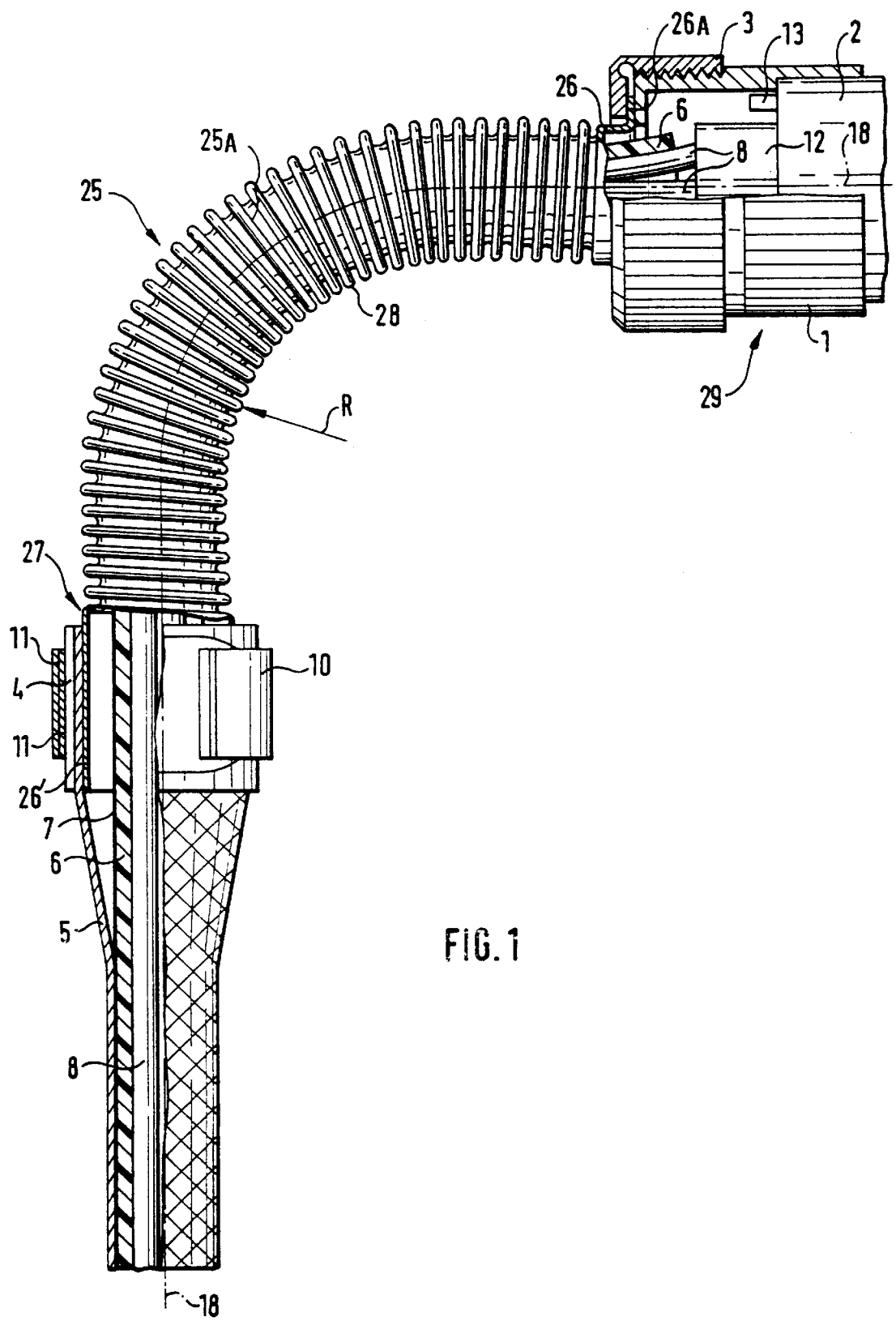
FIG. 1 is a partially cut-away plan view of a connector element according to the invention having a directional guide hose embodied as a corrugated hose with a compressed portion, being attached to a connector plug as an example embodiment.

Several example embodiments of the invention will now be described in greater detail to provide a clear understanding of the invention. FIG. 1 shows the basic construction of an embodiment of the invention. A connector element 29 including a threaded screw-on component 1, a female collar nut 3 that can be screwed onto the screw-on component 1, and a directional guide hose 25, is attached, by way of example, to an electrical connector plug 2. Reference number 12 identifies a seal (grommet) for electrical cables, and reference number 13 identifies a position tooth for a backshell. The directional guide hose 25 is a bendable, yet form-retaining, flexurally stiff, and electrically conducting corrugated hose 25. The corrugated hose 25 is fixed to the screw-on component 1 by the collar nut 3, as described in detail below. The corrugated hose 25 is preferably electrically connected to an aircraft structure, which is not shown.

The directional guide hose 25, i.e. the corrugated hose 25, is intended to enclose and guide electrical cables along an appropriate path to connect various electrically operated devices or assemblies arranged very closely together in very tight spaces within an aircraft. While being installed, the corrugated hose 25 can be mechanically bent, by hand, to any required angle or configuration within an angular range up to 180°, in order to achieve any final configuration necessary to fit in very tight spaces of various configurations. As discussed herein, the flexural stiffness of the corrugated hose 25 refers to the final installed configuration of the hose 25, which is to be maintained and not to be altered during flight by external mechanical loads or other influences, such as mechanical shocks, vibrations, or other transmitted loads. Thus, once the hose 25 is laid out in the desired configuration, it forms a flexurally stiff conduit member that can only be reconfigured into a different bent shape through further, purposeful mechanical bending.

FIG. 1 further shows a braided-type, electrically conducting hose 5, preferably made of metal, that forms a sheath around a braided-type, nonconducting, synthetic material hose 6. The synthetic hose 6 encloses and provides abrasion protection for insulated electrical conductors or cables 8, especially auxiliary and control cables, and guides the cables 8 in the direction of the central axis 18 of the connector element 29. After exiting the hose 6, the cables 8 are guided through the corrugated guide hose 25 to the electrical contacts (which are not shown) of the electrical connector plug 2, to which they are then electrically connected. A clamping fixture 10, including a clamping band 11, secures the transition between the corrugated guide hose 25 and the adjacent metal braided hose 5 as discussed below.

An electrically non-conducting fixing medium 7 is preferably arranged between the synthetic hose 6 and the metal braided hose 5, to at least surround the cables 8 over the range of the synthetic hose 6, and preferably also extends directly to the contact elements of the connector plug 2. The fixing medium 7 consists of a synthetic, such as a plastic or a rubber material.

The directional guide hose 25, which, for example, comprises a metal corrugated hose 25, has two flat connector ends 26 and 26'. A flange 26A is provided at one connector end 26 and extends substantially radially as shown in the drawings. The flange 26A serves to connect the hose 25 to the electrically conducting screw-on component 1, by means of the threaded collar nut 3 that is screwed onto the screw-on component 1. The hose 25 passes through a hole in the collar nut 3, so that the collar nut 3 engages the flange 26A and clamps it against the end face of the screw-on component 1, whereby an electrically conductive connection between the hose 25 and the connector plug 2 is realized through the screw-on component 1.

A substantially cylindrical, smooth collar or sleeve 27 is formed on the other connector end 26' of the corrugated hose 25. The metal braid 5 is pushed over the outer surface of the sleeve 27 in a direction toward the corrugated hose 25, and then an electrically conducting, slit clamping sleeve 4 is arranged around the area of the sleeve 27. A clamping fixture 10 then tightly clamps this portion of the arrangement by means of a clamping band 11.

The directional guide hose 25 in the embodiment of FIG. 1 may have spiral corrugations or ring corrugations. The hose 25 can be laid out in a straight path and/or may be bent to have a radius of curvature R. The hose 25 can be bent to various angles to form a variable conduit elbow having one or more bends in the angular range from 0° to 180°, whereby the bends may lie in one or more planes. The corrugated hose 25 can be laid out in any required configuration while maintaining its rated wall thickness and its rated inner diameter, and while maintaining or varying the spacing of its corrugations. The hose 25 can be connected to another hose having the same corrugation spacing or several hoses having different corrugation spacings, as will be described below with reference to FIGS. 2 to 4.

The corrugated hose 25 comprises at least one compressed zone or portion 25A having a relatively small corrugation spacing, for example the pitch for compressed portion 25A is 2 to 5 mm depending on the diameter, thickness, kind and strength of the material of the corrugated hose. The compressed portion 25A forms a curved elbow portion 28 having a radius of curvature R. This compressed portion 25A can be laid out straight and is bendable as described above so as to form any necessary curvature. The spacing or pitch and the height of the corrugations, as well as the wall thickness of the corrugated hose 25, determine the flexural stiffness of the hose 25 and therewith the flexural stability of the screw-on component 1 and, for example the connector plug 2, connected to the hose 25. This embodiment enables a single connector element 29 to be used for various different applications requiring different configurations or bend angles, whereby such a connector element can be used in the tightest possible spaces, in a space-saving manner between the electrical devices an aircraft. This results in savings of material, costs, and weight, which are indispensable in the field of aircraft construction.

Figure 2:
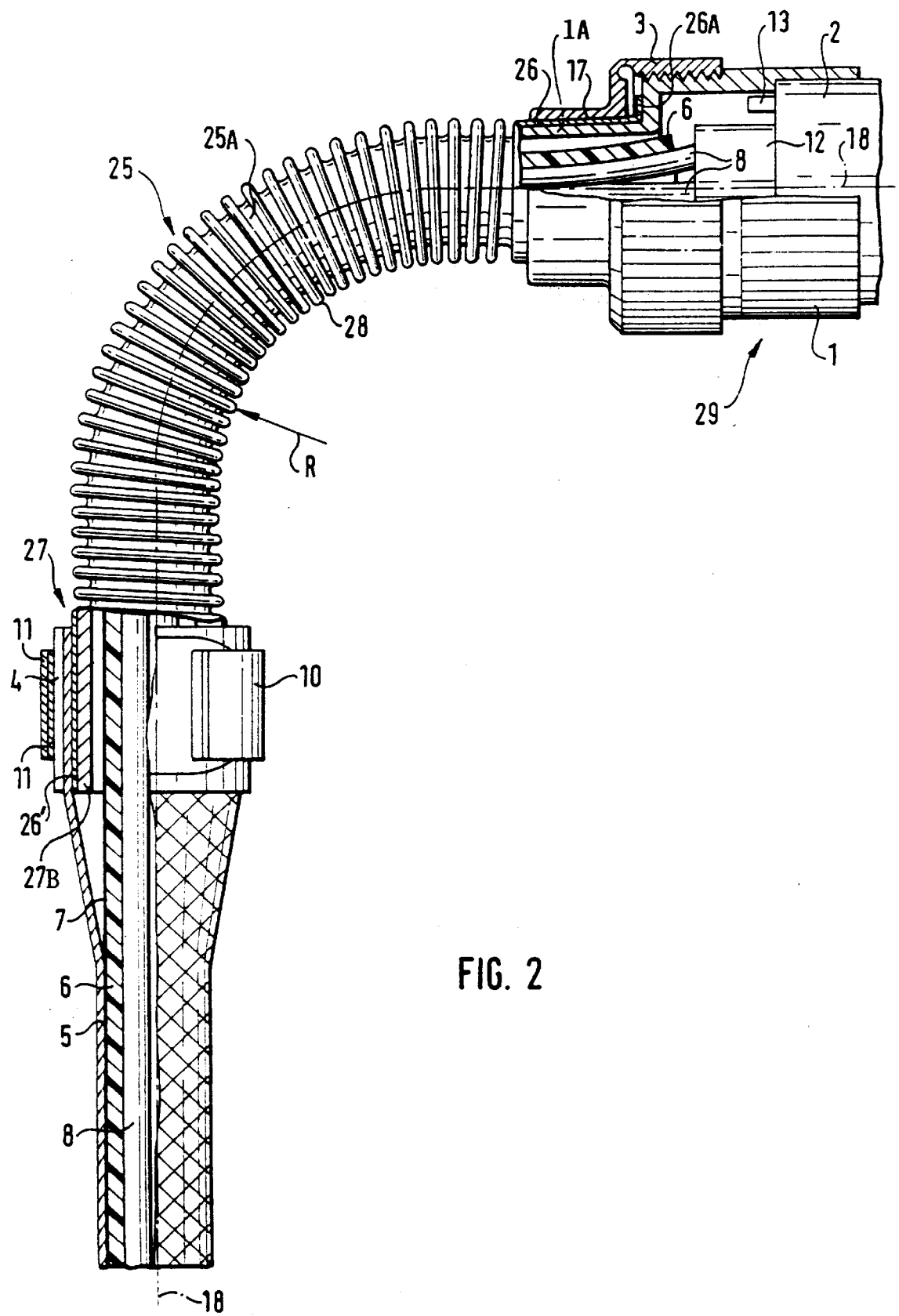
FIG. 2 is a view similar to that of FIG. 1, but showing a modified attachment of the corrugated hose to the screw-on component.

FIG. 2 shows a modified connection of the guide hose 25 to the screw-on component 1. In distinction to the embodiment of FIG. 1, here the screw-on component 1 includes a conical, partial clamping collar 1A extending in a direction toward the corrugated hose 25 along the central axis 18 of the hose 25. The flange 26A includes the above-described radially extending flange part and a conical sleeve part that fits over the conical collar 1A of the screw-on component 1. The threaded collar nut 3 also includes an internal conical surface 17 matching the conical slope of the collar 1A of the screw-on component 1. Thus, the conical inner surface 17 of the collar nut 3 clamps the conical sleeve portion of the flange 26A against the clamping collar 1A, to connect the hose end 26 to the screw-on component 1. The radially extending flat portion of the flange 26A serves to retain the hose 25 in the collar nut 3, for example when the collar nut 3 is removed from the screw-on component 1. Furthermore, the flat, radially extending portion of the flange 26A may additionally be clamped against an end face of the screw-on component 1 in a manner described with reference to FIG. 1.

The smooth sleeve 27 at the other connector end 26' of the hose 25 is reinforced, one- or two-fold, by a smooth support bushing or sleeve 27B arranged within the sleeve 27. By using the support sleeve 27B, higher clamping forces can be applied by the clamping band 11 for fixing the metal braid 5 onto the smooth sleeve 27, whereby the electrical transition resistance at this area of the arrangement is reduced.

Figure 3:
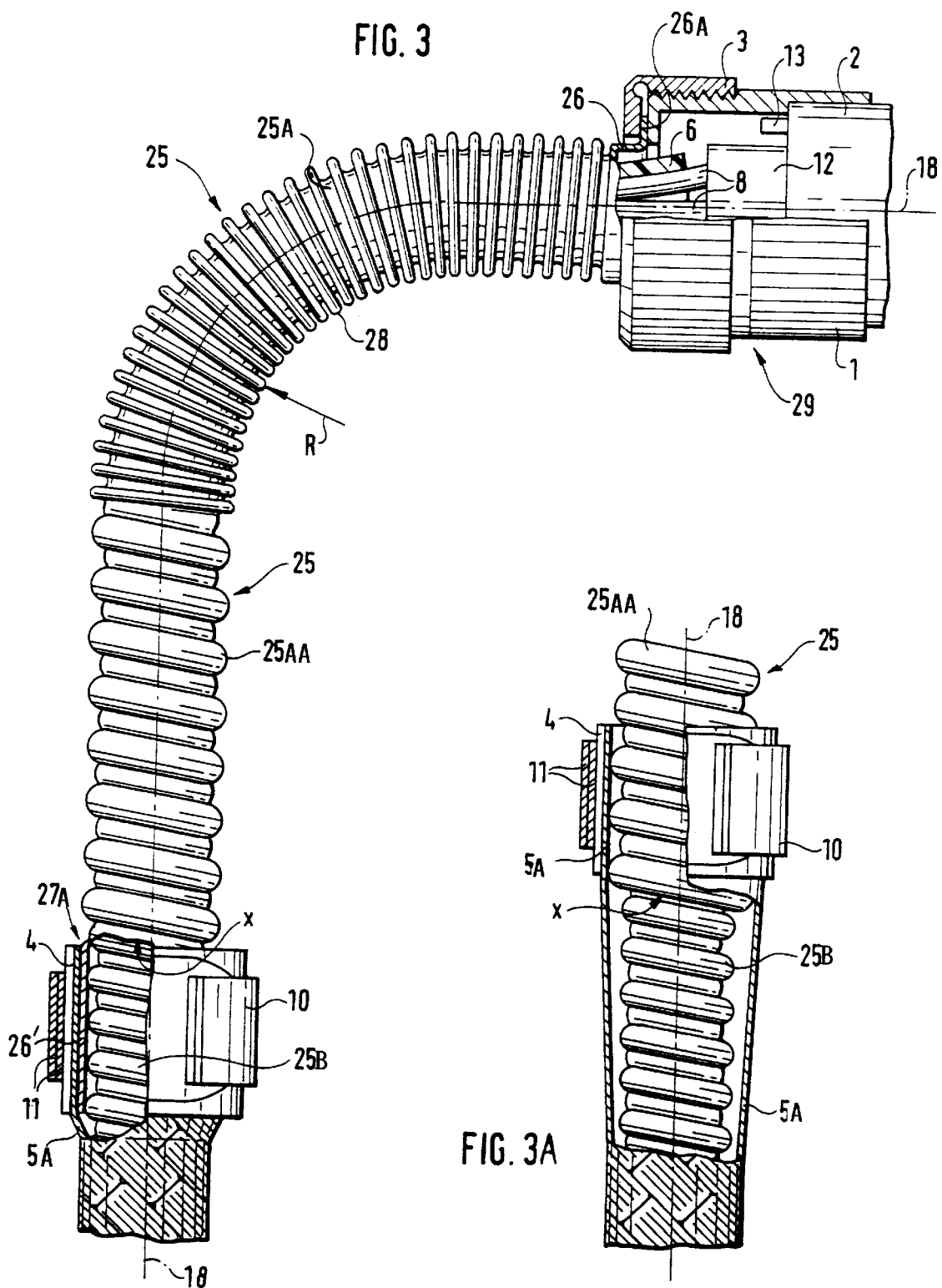
FIG. 3 is a partially cut-away plan view of another embodiment of the connector element according to the invention, wherein the corrugated hose has a compressed portion and an expanded portion, and showing another corrugated hose having a braided metal sheath connected to the first corrugated hose.

In the embodiment of FIG. 3, the guide hose 25 further includes a stretched, extended or expanded corrugated hose portion 25AA in addition to the above described compressed portion 25A. The portion 25A of the hose 25 that is to be bent to form a curved elbow portion 28 is compressed together so that it can retain its bent form in its final configuration. Preferably, the compressed portion 25A and the adjacent expanded portion 25AA are joined or formed together in a seamless manner. The expanded portion 25AA has a relatively large corrugation spacing, for example the pitch for the expanded (stretched) portion 25AA is 3 to 8 mm depending on the diameter, thickness, kind and strength of the material of the corrugated hose. A smooth sleeve 27A is provided at the free connector end of the expanded portion 25AA, wherein the sleeve 27A may be formed from the end of the corrugated hose or may be formed onto or attached to the hose. An additional corrugated hose 25B, preferably having spiral corrugations with the same corrugation spacing or pitch as the portion 25AA, can be pushed into the sleeve 27A and screwed into the circular hollow cross-section of the hose portion 25AA at the connection point X. Alternatively, the additional hose 25B can be screwed onto, i.e. over, the external diameter of the end of the expanded portion 25AA of the hose 25 at the connection point X.

The additional corrugated hose 25B preferably consists of a synthetic material and protects the electrical cables 8 against abrasion. At an attachment area, the smooth sleeve 27A of the conductive hose 25 extends over a portion of the exterior surface of the additional corrugated hose 25B adjacent to the portion of the hose 25B that is screwed into the expanded portion 25AA of the hose 25. A metal braided hose 5A is arranged over the synthetic hose 25B and is pushed over the smooth sleeve 27A. A slit clamping sleeve 4 is arranged to secure the connection area using the clamping band 11 of the clamping fixture 10 as described above.

In the alternative embodiment of FIG. 3A, the expanded portion 25AA of hose 25 does not have a smooth sleeve 27A at its end. The additional hose 25B is screwed directly into the expanded portion 25AA and the metal braid 5A is directly pulled over the end of the expanded portion 25AA. A clamping sleeve 4 fixes the metal braid 5A and the additional hose 25B to the expanded portion 25AA, and the connection is secured as described above using the clamping fixture 10 having a clamping band 11.

Figure 4:
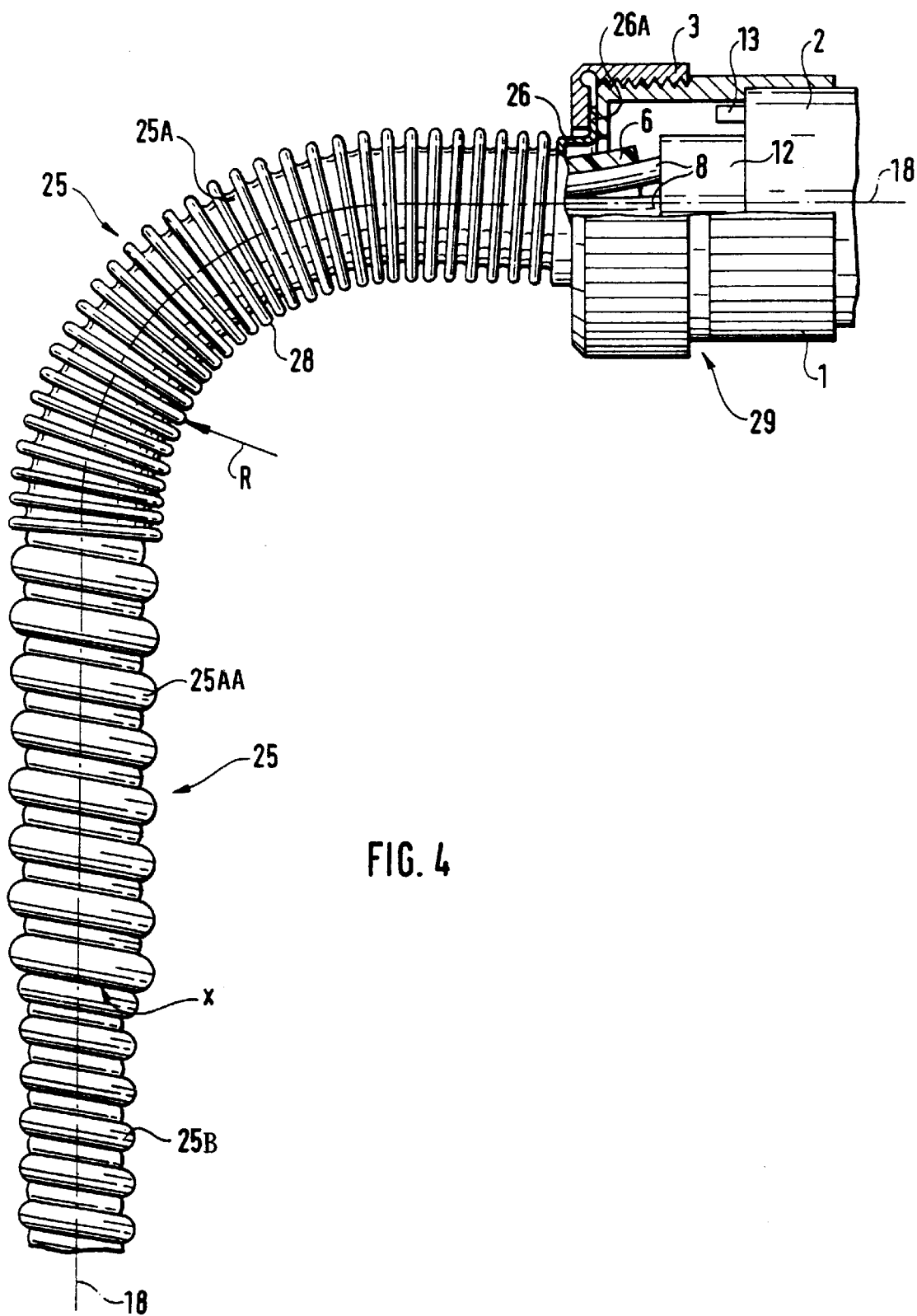
FIG. 4 shows the connector element of FIG. 3 further connected to a plastic corrugated hose without a metal braided sheath.

The embodiment of FIG. 4 is similar to that of FIG. 3, but without a smooth sleeve 27A at the end of the hose 25. A metal braided hose 5A (not shown here), can be directly secured onto the end of the hose 25 in the area of the connection point X, into which the additional corrugated hose 25B is screwed. The additional hose 25B is made of a synthetic material such as a plastic, to provide mechanical protection, especially against abrasion, for the electrical conductors or cables or cable harnesses arranged within the hose 25B. Also, for all example embodiments, the conductors or cables 8 are sheathed by the synthetic material braided hose 6 at least over the region of the guide hose 25, to protect the cables 8 against abrasion.

The embodiments of the invention enable the connector element 29 to be installed in aircraft, to lay and hold electrical conductors in a desired configuration having various bend angles in the tightest possible spaces. Such embodiments provide an effective protection against external mechanical and electrical influences, such as electromagnetic interferences caused by lightning strikes or by on-board systems of other aircraft.

Although the invention has been described with reference to specific example embodiments, it will be appreciated that it is intended to cover all modifications and equivalents within the scope of the appended claims.

What is claimed is:

1. A connector element for laying electrical conductors, comprising a screw-on component, a collar nut adapted to be screwed onto said screw-on component, and a bendable and shape-retaining corrugated hose that comprises at least one compressed hose portion having a first corrugation spacing, a flange at a first end of said corrugated hose, and a smooth sleeve at a second end of said corrugated hose opposite said first end, wherein said collar nut is adapted to engage said flange and connect said corrugated hose with said screw-on component, and further comprising a non-conducting synthetic material inner braided hose inserted into and extending from said smooth sleeve, a conducting metallic material outer braided hose circumferentially enclosing and extending along said inner braided hose and overlapping an outer surface of said smooth sleeve, and a clamping fixture securing said outer braided hose onto said smooth sleeve.

2. The connector element of claim 1, wherein said corrugated hose comprises corrugations selected from the group consisting of ring corrugations and spiral corrugations.

3. The connector element of claim 1, further comprising a fixing material sheath comprising a material selected from the group consisting of plastics and rubbers arranged between said inner braided hose and said outer braided hose.

4. The connector element of claim 1, further comprising a support sleeve inserted into said smooth sleeve between said smooth sleeve and said inner braided hose.

5. The connector element of claim 1, wherein said corrugated hose further comprises an expanded hose portion attached to said compressed hose portion at a seamless transition, wherein said expanded hose portion has a second corrugation spacing that is larger than said first corrugation spacing.

6. The connector element of claim 5, wherein said second end of said corrugated hose opposite said first end is an end of said expanded hose portion, and said smooth sleeve is provided at said end of said expanded hose portion.

7. The connector element of claim 1, wherein said corrugated hose is electrically conducting and is adapted to be bent to and retain an elbow angle within the range from 0° to 180°.

8. The connector element of claim 1, wherein said screw-on component comprises a conically tapered collar, said flange comprises a smooth conical sleeve adapted to be seated on said conically tapered collar, and said collar nut comprises a conically tapered clamping surface adapted to clamp said conical sleeve onto said conically tapered collar.

9. A connector element for laying electrical conductors, comprising a screw-on component, a collar nut adapted to be screwed onto said screw-on component, and a bendable and shape-retaining corrugated hose that comprises at least one compressed hose portion having a first corrugation spacing and that comprises a flange at a first end of said corrugated hose, wherein said collar nut is adapted to engage said flange and connect said corrugated hose with said screw-on component, said screw-on component comprises a conically tapered collar and a first radially extending shoulder, said flange comprises a smooth conical sleeve adapted to be seated on said conically tapered collar and a radially extending flange rim at an end of said flange, and said collar nut comprises a conically tapered clamping surface adapted to clamp said conical sleeve onto said conically tapered collar and a second radially extending shoulder adapted to receive said radially extending flange rim between said first and second radially extending shoulders, and further comprising a spiral corrugated supplementary connector hose screwed into an inner diameter or screwed onto an outer diameter of a second end of said bendable and shape-retaining corrugated hose opposite said first end.

10. The connector element of claim 9, wherein said supplementary connector hose is non-conducting, consists of a synthetic material, and is adapted to provide abrasion protection for said electrical conductors.

11. The connector element of claim 9, wherein said bendable and shape-retaining corrugated hose further comprises an expanded hose portion attached to said compressed hose portion, wherein said second end is an end of said expanded hose portion, and wherein said expanded hose portion has a second corrugation spacing that is larger than said first corrugation spacing and said supplementary connector hose has a third corrugation spacing equal to said second corrugation spacing.

12. The connector element of claim 11, further comprising a conducting, metallic material, outer braided hose circumferentially enclosing and extending along said supplementary connector hose and overlapping onto said second end.

13. The connector element of claim 12, wherein said expanded hose portion comprises a smooth sleeve at said second end, and wherein said outer braided hose overlaps an outer surface of said smooth sleeve.

14. The connector element of claim 12, further comprising a clamping fixture securing said outer braided hose onto said second end.

15. A connector element for laying electrical conductors, comprising a screw-on component, a collar nut adapted to be screwed onto said screw-on component, and a bendable and shape-retaining corrugated hose that comprises at least one compressed hose portion having a first corrugation spacing and that comprises a flange at a first end of said corrugated hose, wherein said collar nut is adapted to engage said flange and connect said corrugated hose with said screw-on component, said screw-on component comprises a conically tapered collar and a first radially extending shoulder, said flange comprises a smooth conical sleeve adapted to be seated on said conically tapered collar and a radially extending flange rim at an end of said flange, and said collar nut comprises a conically tapered clamping surface adapted to clamp said conical sleeve onto said conically tapered collar and a second radially extending shoulder adapted to receive said radially extending flange rim between said first and second radially extending shoulders, and further comprising a corrugated supplementary connector hose connected to a second end of said bendable and shape-retaining corrugated hose opposite said first end, wherein said supplementary connector hose is electrically conducting and comprises at least one material selected from the group consisting of synthetic materials and metallic materials.

16. A connector element for laying electrical conductors, comprising a screw-on component, a collar nut adapted to be screwed onto said screw-on component, and a bendable and shape-retaining corrugated hose that comprises at least one compressed hose portion having a first corrugation spacing and that comprises a flange at a first end of said corrugated hose, wherein said collar nut is adapted to engage said flange and connect said corrugated hose with said screw-on component, said screw-on component comprises a conically tapered collar and a first radially extending shoulder, said flange comprises a smooth conical sleeve adapted to be seated on said conically tapered collar and a radially extending flange rim at an end of said flange, said collar nut comprises a conically tapered clamping surface adapted to clamp said conical sleeve onto said conically tapered collar and a second radially extending shoulder adapted to receive said radially extending flange rim between said first and second radially extending shoulders, said corrugated hose including said flange is electrically conducting, said screw-on component is electrically conducting, and said smooth conical sleeve and said radially extending flange rim of said flange provide an electrically conducting connection between said corrugated hose and said screw-on component.

17. The connector element of claim 16, wherein said radially extending flange rim of said corrugated hose is clamped directly between said first and second radially extending shoulders with said flange rim in direct contact respectively with said first radially extending shoulder and with said second radially extending shoulder.

\* \* \* \* \*